United States Patent

Collins

[11] 4,041,217
[45] Aug. 9, 1977

[54] THERMAL BATTERY WITH METAL-METAL OXIDE HEATING COMPOSITION

[75] Inventor: William H. Collins, Timonium, Md.

[73] Assignee: Catalyst Research Corporation, Baltimore, Md.

[21] Appl. No.: 378,489

[22] Filed: June 23, 1964

[51] Int. Cl.² .......................................... H01M 6/36
[52] U.S. Cl. .................................... 429/112; 149/37
[58] Field of Search ....................... 136/90, 137, 153; 75/22; 429/112; 149/37

[56] References Cited

U.S. PATENT DOCUMENTS

| | | | |
|---|---|---|---|
| 3,079,454 | 2/1963 | McGinnis | 136/90 |
| 3,575,714 | 4/1971 | Bennett et al. | 429/112 |
| 3,884,719 | 5/1975 | Evans et al. | 429/112 |

Primary Examiner—Edward A. Miller

EXEMPLARY CLAIM

1. A thermal battery comprising a plurality of cells, said cells comprising a metallic positive electrode and a metallic negative electrode spaced by a normally inactive electrolyte that becomes electrically active when heated, a combustible composition disposed between said cells and in contact therewith for supplying heat to the electrolyte, means for igniting said composition, said composition comprising an intimate mixture of a finely divided metal oxide and a finely divided metal capable of exothermically reacting with said metal oxide to form an electrically conductive metal oxide reaction product, thereby forming an electrically conductive ash when burned and providing an electrical connection between said cells.

7 Claims, 3 Drawing Figures

U.S. Patent     Aug. 9, 1977     4,041,217
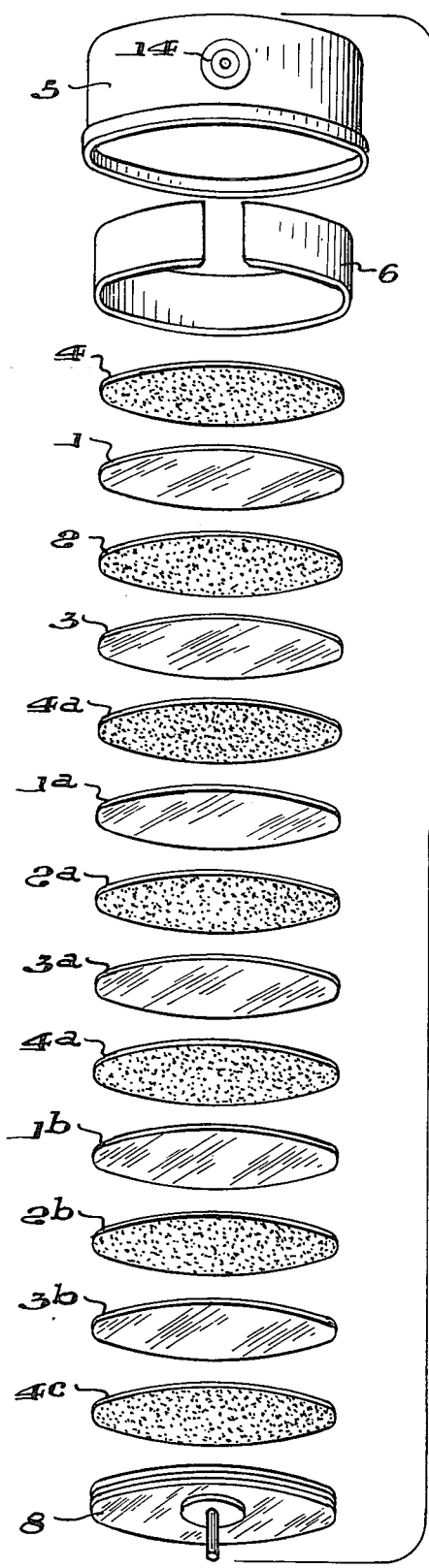
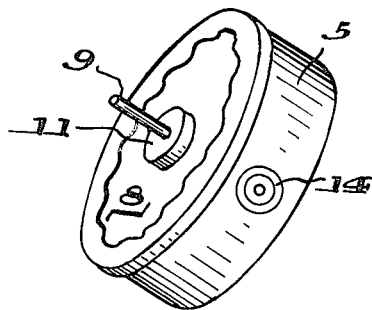
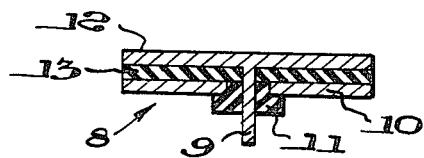
INVENTOR
WILLIAM H. COLLINS
BY Ronald H. Shakely
his ATTORNEY

THERMAL BATTERY WITH METAL-METAL OXIDE HEATING COMPOSITION

This invention relates to thermal type deferred action primary batteries.

Thermal type deferred action primary batteries are characterized by being inactive at normal atmospheric temperatures, and become active only upon heat being supplied thereto. Such batteries include an assembly of two or more primary cells connected by electrical leads, each of which cells include one positive plate and one negative plate and an electrolyte that is solid and inactive at ordinary temperatures but which becomes functionally active when heat is supplied in an amount sufficient to melt, or fuse, the electrolyte. The necessary supply of heat to activate such batteries has been provided by associating with the battery a combustible composition that undergoes exothermic reaction without the liberation of any substantial amount of gas, as by positioning a pad containing the combustible composition between each individual cell of the battery. Such batteries are usually used in service requiring extremely rapid activation and therefore cell components including electrodes are generally thin wafers permitting rapid transfer of heat throughout the battery. In order to eliminate the need to weld or solder leads connecting the various cells, leads have been formed of integral extensions of the electrodes; these leads, like the electrodes, are thin and have a comparatively small cross-section area resulting in comparatively high internal cell resistance, particularly when using nickel at high temperatures.

It is an object of the present invention to provide thermal type deferred action batteries of simplified construction that can be made extremely compact and of small size and that are characterized by being durable, of long shelf life, shock resistant, and having low internal electrical resistance. Another object of this invention is to provide a combustible composition to provide heat for such thermal batteries that forms an electrically conductive ash when burned. Other objects will be apparent from the following description and claims.

In accordance with this invention, such thermal batteries are formed of two or more stacked cells, each cell being spaced from the adjacent cell by a combustible composition that undergoes exothermic reaction without the liberation of any substantial amount of gas and that forms an electrically conductive ash when burned. Thus, when the battery is activated by burning the combustible material to provide heat to melt or fuse the electrolyte, the ash formed thereby provides an electrical connection between the adjacent cells. Such combustible compositions of this invention preferably comprise a mixture of a finely divided metal oxide and a finely divided metal that will exothermically react with the metal oxide to form an electrically conductive oxide.

Batteries made in accordance with this invention comprise a plurality of the wide variety of thermally activated cells, which cells comprise a metallic anode, a metallic cathode and a suitable solid electrolyte. The materials used for these elements may be chosen with a view to such factors as the electrical characteristics desired, economics, and the like, as the fabricator desires. However, it has been found that nickel, suitably in the form of the alloy, Inconel, is a very satisfactory base material from which the electrodes may be made. The nickel may be the actual active electrode metal, as in the case of the nickel electrode in a nickel-calcium cell, or it may be a base material coated with an active electrode metal, e.g., calcium or magnesium. Alternatively, electrodes may be a sheet of active electrode metal, e.g., calcium or magnesium, or may be a coherent pellet formed by compressing finely divided electrode metal, e.g., pelletized magnesium. Typical electrode pairs include Ni-Ca, Mg-Ca, Mg-Cu, Mg-Fe, Mg-Pt, Ca-Fe, and Ca-Ag.

A wide variety of electrolytes applicable in the practice of the invention are, of course, available. The major criteria are that the electrolyte shall be and remain solid and non-conductive until the cell is to function, that it shall become active, or conductive, when heated, as by actuation of an exothermic composition, and that it shall act as an electrolyte in cooperation with the electrodes to supply the desired current. The electrolyte should be thermally stable, and the melting point should be relatively low, e.g., 150° to 500° C. to provide for fast activation by a small amount of heat and also for longer life for a given heat supply.

Thus, single salts or mixtures of salts having melting points applicable to any given case in question may be used. Commonly, it is preferred to use eutectic compositions of two or more salts because thereby desired low melting compositions are supplied. Other important physical properties of the electrolyte are the boiling point, for the salt should not vaporize under the heat supplied, and the heat of fusion and the specific heat. The coefficient of thermal expansion is significant only in that the cell components should not show excessive relative dimensional changes in order to avoid creation of undesirable stresses within the cell.

Chemically, the electrolyte should, for most purposes, not undergo reactions, other than electrochemical, with the cell components, i.e., the electrodes or any electrolyte carrier that is used, although where brief action only is necessary the reactivity factor becomes unimportant. Likewise, the electrolyte should not ordinarily undergo gas liberating reaction within itself while heated.

Suitably, the electrolyte is supported by a carrier, of which a variety are available. The major criteria are that the carrier shall be and remain solid and non-conductive throughout the fabrication, storage and functional life of the cell, be porous to the ionic migration of the fused electrolyte during the functional life of the cell, and by maintaining a definite thickness be a physical spacer between the electrodes when the electrolyte is molten. Thus metal oxides, asbestos fiber, glass fiber products, or ceramics of high melting point and insolubility applicable to any given case may be used. Commonly, it is preferred to use a flexible tape woven or felted from fibers of a high melting point, insoluble, high dielectric material or from mixtures of two or more kinds of such fibers.

Suitably, an electrolyte pad consisting of an electrolyte carrier impregnated with electrolyte may be used. Such electrolyte pads are prepared by passing a ribbon of cleaned woven fiberglas tape through a melt of the preferred electrolyte at a controlled temperature and a controlled rate thereby controlling the weight of the electrolyte impregnated in the carrier. The impregnated tape is then cooled in such a manner that all components are solid. Electrolyte pads of preferred shape, compositions and weight are then cut from the tape. Such electrolyte pads consist of two distinct components, one being the inert carrier portion that remains continuously solid throughout the fabrication, storage and functional life of the thermal cell, and the other being the electrolyte portion that is liquid during impregnation of the carrier, is solid during storage life of the thermal cell and is molten during the functional life of the thermal cell. Typical electrolytes useful in the practice of the invention are the lithium bromide-potassium bromide eutectic (m.p. 348° C.), lithium hydroxide (m.p. 450° C.), potassium hydroxide (m.p. 360° C.), binary mixtures such as lithium nitrate-lithium hydroxide (m.p. 370°-380° C.), the lithium chloride-potassium chloride eutectic (m.p. 364° C.) and the lithium hydroxide-lithium chloride eutectic (m.p. 290° C.).

With most combinations of electrodes and electrolytes a depolarizer is desirably present. This may be accomplished by the use of a variety of readily reducible oxidizing but thermally stable agents that may be incorporated in the electrolyte itself, or if the depolarizer tends to exert an undesirable action at the electron source it may be applied directly to the surface of the electron sink, or negative electrode. It is even possible to supply a depolarizer by chemical reaction within the cell. Among the depolarizers that will function in the electrolyte, potassium dichromate ($K_2Cr_2O_7$), potassium chromate ($K_2CrO_4$), molybdic oxide ($MoO_3$), and tungstic oxide ($WO_3$) have been found to be satisfactory with various electrode pairs. The depolarizer may be in solution or in suspension in the electrolyte, or be applied to one or both electrodes.

One mode of pasting depolarizer to an electrode is to paint the electron sink with a water slurry of tungstic oxide and lead chromate ($PbCrO_4$) and then applying heat; the lead chromate melts at a relatively low temperature and acts as a cement to hold the tungstic oxide in place. A negative electrode depolarizer found to be of value is composed of 4 parts of $WO_3$ and 1 part of $PbCrO_4$.

For many purposes it is now preferred to use a single pellet or wafer containing the electrolyte and depolarizer, formed by compressing a finely divided intimate mixture of electrolyte, for example, lithium chloride-potassium chloride eutectic, a suitable depolarizer, for example, calcium chromate, and an inert absorbent, for example, bentonite, kaolin or magnesium oxide, to form a coherent compact. Such wafers are described in the co-pending application of Richard L. Blucher, Ser. No. 182,714, filed Mar. 22, 1962.

In accordance with this invention, the supply of heat required to activate the deferred action thermal batteries is provided by a combustible composition that undergoes exothermic reaction without the liberation of any substantial amount of gas and that forms an electrically conductive ash when burned. Adjacent cells in the batteries are spaced only by such combustible composition and are not otherwise electrically connected. Thus, when the combustible composition is ignited to provide heat to activate the battery, the electrically conductive ash formed by the burning of the combustible composition provides a low resistance electrical connection between the cells in the battery, eliminating the need for separate structural electrical leads connecting the cells and thereby eliminating the necessity of attaching such leads to the cells or forming the cell from complex electrode structures having integral connecting leads.

Suitable combustible compositions for use in the batteries of this invention include intimate mixtures of a finely divided metal oxide with a finely divided reducing metal that will exothermically react to form an electrically conductive metal oxide that is dispersed throughout the composition, as by melting or subliming. It is especially desirable to use combustible compositions that originally have an extremely low conductivity but form, on burning, an ash with extremely high conductivity; such compositions comprise higher oxides of metals having at least two valence states and that form on partial reduction an electrically conductive lower oxide, for example, tungsten trioxide and molybdenum trioxide. Any metal that reduces the oxide may be used; that is, any metal that forms oxides having a lower free energy of formation than the metal oxide to be reduced. Suitable reducing metals for use with the tungsten trioxide and molybdenum trioxide include iron, cobalt, nickel, chromium, molybdenum, aluminum, boron, magnesium, titanium and zirconium and tantalum.

The proportion of metal in the combustible composition is not more than about the stoichiometric amount required to reduce the higher metal oxide to the desired lower oxidation state. Somewhat more metal may be used for applications where atmospheric oxygen will be available to the reaction, e.g., to account for air entrapped in batteries. Some metals form a number of oxides, and the metal constituent may be used in any amount up to stoichiometric required by reaction with the oxide constituent to form the lowest suitable oxide. For example, tungsten forms a number of oxides lower than tungsten trioxide, e.g. $W_2O_5$, $W_4O_{11}$, $W_2O_3$, and WO, all of which are conductive, thus the stoichiometric amount of metal may be based on a reaction to yield any of these lower oxides. Proportions of metal as low as about 20% of stoichiometric may be used as desired, the proportions being varied to provide the amount of heat and burning rate desired. Inert diluents, such as sand, may also be added to adjust the amount of heat produced; but the total amount of such diluents, including fibers used in forming pads, should not exceed about 40% of active combustible composition to avoid a noticeable affect on the electrical conductivity of the produced ash.

Pads of combustible material suitable for convenient use in batteries may be formed from thoroughly mixed slurries of metal oxide powder, metal powder, inert diluent if desired, and inorganic fibers, such as asbestos fibers, glass fibers, ceramic fibers or the like. It is preferred that the fibers be fine and flexible, since pads produced therefrom are more flexible and more dense. Pads may be formed from such slurries in a number of conventional ways, for example, by forming and drying in a sheet mold. Also, a mat may be formed by laying down the slurry on a screen, to form essentially a fiber paper filled with the combustible composition, using conventional paper-making equipment, such as a cylinder paper machine or Fourdinier machine. At least about 12% fibers are required to form a coherent pad and up to 25% or more fibers can generally be used without any noticeable affect on the conductivity of the ash formed by burning the pad. Drying temperatures must, of course, be kept below the ignition temperature of the combustible composition.

Alternatively, finely divided and well mixed constituents of the combustible composition, with or without fibers, may be compressed, either in the wet or dry state, to form a coherent compact pellet or wafer. The temperature during compression must, of course, be kept below the ignition temperature of the combustible composition and in some instances this may require that the mixture be cooled. Heating pads of the desired shape for use in batteries may be cut or punched from larger pads formed as described above, and the pelletized wafers are formed in the desired shape.

The following example is illustrative of heating compositions of this invention.

A mat was formed in a sheet mold from a thoroughly mixed aqueous slurry containing 19.0 grams of powdered zirconium, 42.5 grams of tungsten trioxide, 6.5 grams of glass fibers and 6.5 grams of ceramic fibers. After being dried, the mat was positioned between two metal plates in one arm of a Wheatstone bridge. The mat was ignited and the resistance, determined in the usual manner, was found to be less than 0.1 ohm per square inch. Such pads have a resistance on the order of 100,000 ohms per square inch before ignition. Similarly, low conductivity ashes are obtained using other reducing metals or when using molybdenum trioxide with zirconium or other reducing metals.

The batteries of this invention, utilizing the new heating compositions, will be described further in conjunction with the appended drawings in which:

FIG. 1 is an exploded perspective view of a battery made in accordance with this invention;

FIG. 2 is a sectional view of the cap member shown in FIG. 1; and

FIG. 3 is a perspective view of the battery assembled from the elements of FIG. 1.

Referring to FIG. 1, the battery shown indicates three cells, each constituted of a negative electrode 1, 1a, and 1b, pelletized wafers of electrolyte, and depolarizer 2, 2a, and 2b, as heretofore described, and positive electroodes 3, 3a and 3b. Heat charges 4, 4a, 4b and 4c as heretofore described that form a conductive ash on burning are disposed between the three cells and on the outer sides of electrodes 1 and 3b. The cell components and heat charges are mounted within a battery case 5 in the form of a cup, suitably of light gauge iron or steel. To insulate the cells from the casing wall there is provided a ring 6 of heat resistant insulation, e.g., fiberglas cloth, that fits snugly within the body, or wall, of the casing. A cap member 8, shown in more detail in FIG. 2, has a metal cover 10, a terminal 9 brought out through a ceramic or other insulating bushing 11 and electrically connected, as by welding, to a metal contact disc 12, which disc is separated from the cover by insulation 13. These elements are packed in the casing in the order shown, preferably under pressure, and the open edge of the casing is crimped over the cap 8 to seal the battery hermetically. The casing is also provided with means for firing the heat charges. In the embodiment shown this takes the form of percussion primer 14 mounted in the casing wall by a primer holder 1 which hermetically seals the primer in such a manner that upon activation of the primer the primer flame ignites the heat charges, either directly or by means of a conventional fuse train from the primer to the heat charges.

Upon ignition of the heat charges, heat is liberated to activate the electrolyte and simultaneously form an electrical connection between the positive and negative electrodes of adjacent cells spaced only by the heat charge. Similarly, the ash formed from the burning of heat pad 4 provides electrical contact of negative electrode 1 with the casing. Insulator 13 insulates heat charge 4c from the casing, and terminal member 9 makes electrical contact with positive electrode 3a through the contact disc 12 and the ash formed by heat charge 4c. External circuiting may then be connected across the battery case and terminal 9 by conventional methods. Other modes of connecting electrical leads to the end electrodes are, of course, permissible.

In accordance with the provisions of the patent statutes, we have explained the principle of our invention and have described what we now consider its best embodiments. However, we desire to have it understood that, within the scope of the appended claims, the invention may be practiced otherwise than as specifically described.

We claim:

1. A thermal battery comprising a plurality of cells, said cells comprising a metallic positive electrode and a metallic negative electrode spaced by a normally inactive electrolyte that becomes electrically active when heated, a combustible composition disposed between said cells and in contact therewith for supplying heat to the electrolyte, means for igniting said composition, said composition comprising an intimate mixture of a finely divided metal oxide and a finely divided metal capable of exothermically reacting with said metal oxide to form an electrically conductive metal oxide reaction product, thereby forming an electrically conductive ash when burned and providing an electrical connection between said cells.

2. A thermal battery according to claim 1, said combustible composition being a pad comprising inorganic fibers and a mixture of a finely divided higher oxide of a metal selected from the group consisting of tungsten and molybdenum with a finely divided metal selected from the group consisting of iron, cobalt, nickel, chromium, molybdenum, aluminum, boron, magnesium, titanium, zirconium, and tantalum, the proportion of metal not substantially exceeding stoichiometric to reduce said higher oxide to a lower oxide.

3. A thermal battery comprising a hermetically sealed housing, a plurality of cells within said housing, each of said cells comprising a metallic positive electrode and a metallic negative electrode spaced by a normally inactive electrolyte that becomes electrically active when heated, one of said cells being an end cell, means adapted for electrically connecting the positive plate of said end cell to an external circuit, one of said cells being an opposite end cell, means adapted for electrically connecting the negative electrode of said opposite end cell to an external circuit, at least one cell intermediate of said end cells, the negative electrode of each intermediate cell being spaced from the positive electrode of an adjacent cell by a combustible composition, the positive electrode of each intermediate cell being spaced from the negative electrode of an adjacent cell by a combustible composition, means for igniting said composition to supply heat to the electrolyte, said composition comprising an intimate mixture of a finely divided metal oxide and a finely divided metal capable of exothermically reacting with said metal oxide to form an electrically conductive metal oxide reaction product, thereby forming an electrically conductive ash when burned and providing an electrical connection between said cells.

4. A thermal battery comprising a stack of plate-like elements, said stack comprising (1) a metallic positive electrode, (2) a solid electrolyte that becomes electrically active when heated adjacent to and in contact with said positive electrode, (3) a metallic negative electrode adjacent to and in contact with said electrolyte, (4) a combustible composition that forms an electrically conductive ash when burned adjacent to and in contact with said negative electrode, and comprising an intimate mixture of a finely divided higher oxide of a metal selected from the group consisting of tungsten and molybdenum with a finely divided metal selected from the group consisting of iron, cobalt, nickel, chromium, molybdenum, aluminum, boron, magnesium, titanium, zirconium and tantalum, the proportion of metal not substantially exceeding stoichiometric to reduce said higher oxide to a lower oxide. (5) a second metallic positive electrode adjacent to and in contact with said combustible composition, (6) a second solid electrolyte adjacent to and in contact with said second positive electrode, and (7) a second metallic negative electrode adjacent to and in contact with said second electrolyte.

5. A thermal battery according to claim 2 in which the metal oxide is tungsten trioxide and the metal is zirconium.

6. A thermal battery according to claim 3 in which the metal oxide is tungsten trioxide and the metal is zirconium, the proportion of zirconium not exceeding stoichiometric to reduce the tungsten trioxide to WO.

7. A thermal battery according to claim 4, said combustible composition being in the form of a pad consisting essentially of inorganic fibers, said higher oxide and said metal.

* * * * *